US 8,379,135 B2

(12) United States Patent
Abe

(10) Patent No.: US 8,379,135 B2
(45) Date of Patent: Feb. 19, 2013

(54) ZOOM LENS AND IMAGING APPARATUS INCLUDING FOCUS CAM FOR CONVERTING ROTATION AMOUNTS INTO FOCUS LENS GROUP MOVEMENT

(75) Inventor: Takashi Abe, Ehime (JP)

(73) Assignee: Panasonic Corporation, Osaka (JP)

( * ) Notice: Subject to any disclaimer, the term of this patent is extended or adjusted under 35 U.S.C. 154(b) by 340 days.

(21) Appl. No.: 12/814,575

(22) Filed: Jun. 14, 2010

(65) Prior Publication Data

US 2010/0315537 A1 Dec. 16, 2010

(30) Foreign Application Priority Data

Jun. 15, 2009 (JP) ................................. 2009-141828

(51) Int. Cl.
*G03B 13/00* (2006.01)
*H04N 5/232* (2006.01)
*H04N 5/262* (2006.01)
*G02B 15/14* (2006.01)

(52) U.S. Cl. ...................... 348/345; 348/240.3; 359/701

(58) Field of Classification Search .................. 348/345, 348/347, 249.99, 240.3, 240.99; 359/699, 359/700, 701
See application file for complete search history.

(56) References Cited

U.S. PATENT DOCUMENTS

| | | | | |
|---|---|---|---|---|
| 4,830,475 A | * | 5/1989 | Ishiyama et al. | 359/684 |
| 5,144,490 A | * | 9/1992 | Yamanouchi | 359/694 |
| 5,223,981 A | * | 6/1993 | Kaneda | 359/698 |
| 5,576,893 A | * | 11/1996 | Yamanouchi | 359/701 |
| 5,592,250 A | * | 1/1997 | Shimizu | 396/79 |
| 5,724,194 A | * | 3/1998 | Ishikawa | 359/696 |
| 5,790,902 A | * | 8/1998 | Mizouchi et al. | 396/142 |
| 5,936,781 A | * | 8/1999 | Kato | 359/699 |
| 5,978,156 A | * | 11/1999 | Okada et al. | 359/699 |
| 6,169,578 B1 | * | 1/2001 | Chigira | 348/347 |
| 6,333,825 B1 | * | 12/2001 | Hamasaki et al. | 359/699 |
| 6,381,076 B1 | * | 4/2002 | Kashiwaba | 359/701 |
| 6,445,416 B1 | * | 9/2002 | Kyuma et al. | 348/240.3 |
| 6,963,366 B2 | * | 11/2005 | Okawara | 348/240.99 |
| 7,006,137 B2 | * | 2/2006 | Kim et al. | 348/335 |
| 7,447,426 B2 | * | 11/2008 | Okawara | 396/79 |
| 7,603,030 B2 | * | 10/2009 | Kashiwaba | 396/86 |
| 7,852,569 B2 | * | 12/2010 | Kobayashi | 359/699 |

(Continued)

FOREIGN PATENT DOCUMENTS

| | | |
|---|---|---|
| JP | 2-266312 | 10/1990 |
| JP | 5-7323 | 1/1993 |

(Continued)

*Primary Examiner* — Nicholas Giles
(74) *Attorney, Agent, or Firm* — Panasonic Patent Center

(57) ABSTRACT

A zoom lens includes a focus cam for converting a first rotation amount given upon a focus operation into a movement of the focus lens group and further converting a second rotation amount given upon a zoom operation into the movement of the focus lens group, and a focus cam follower engaged with the focus cam and operable to move in the focus cam. The focus cum follower rotates in the focus cum according to the rotation amount of the zoom driving unit to move the focus lens group. A lift amount of the focus cam is defined so that a rotation amount of the focus driving unit from a far end position to an infinite position when the rotation position of the zoom driving unit is at a wide-angle end becomes larger than the rotation amount when the rotating position of the zoom driving unit is at a telephoto end.

12 Claims, 14 Drawing Sheets

U.S. PATENT DOCUMENTS

| | | | |
|---|---|---|---|
| 2002/0041334 A1* | 4/2002 | Okawara | 348/335 |
| 2002/0044206 A1* | 4/2002 | Kyuma et al. | 348/240 |
| 2002/0075393 A1* | 6/2002 | Kim et al. | 348/335 |
| 2006/0083505 A1* | 4/2006 | Kashiwaba | 396/79 |
| 2007/0153403 A1* | 7/2007 | Yamazaki | 359/819 |

FOREIGN PATENT DOCUMENTS

| | | |
|---|---|---|
| JP | 5-134163 | 5/1993 |
| JP | 7-5362 | 1/1995 |
| JP | 7-333482 | 12/1995 |

\* cited by examiner

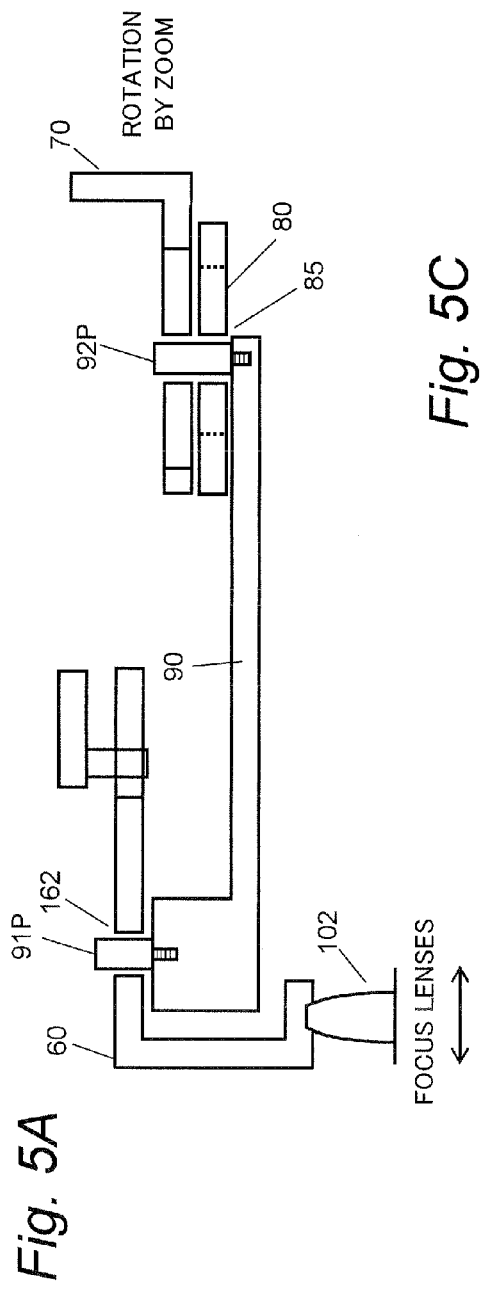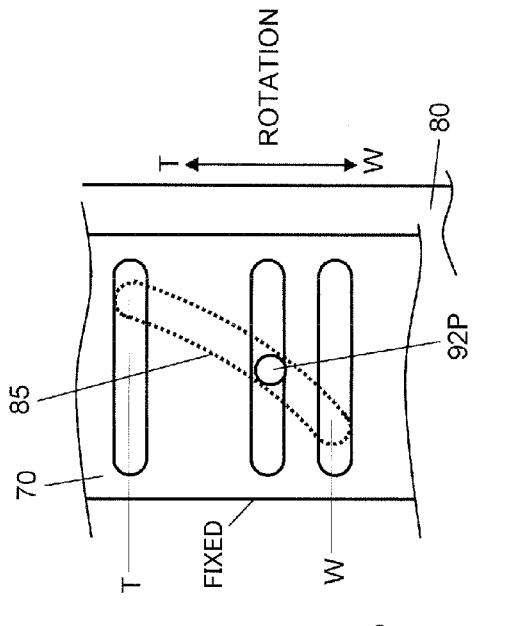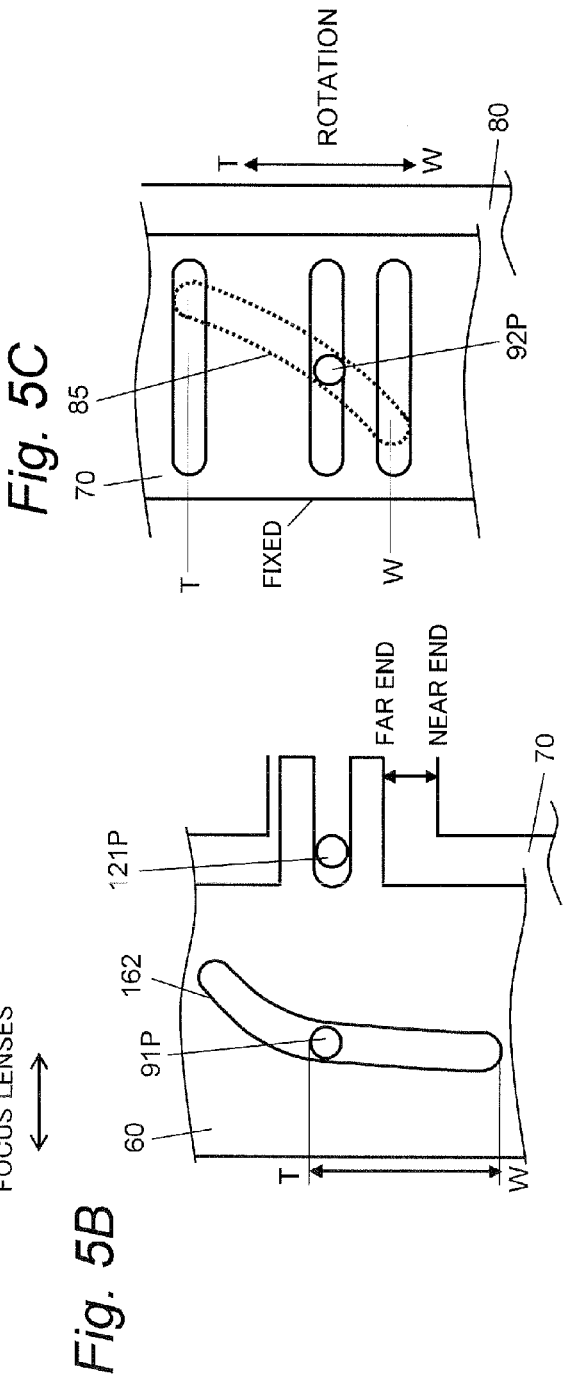

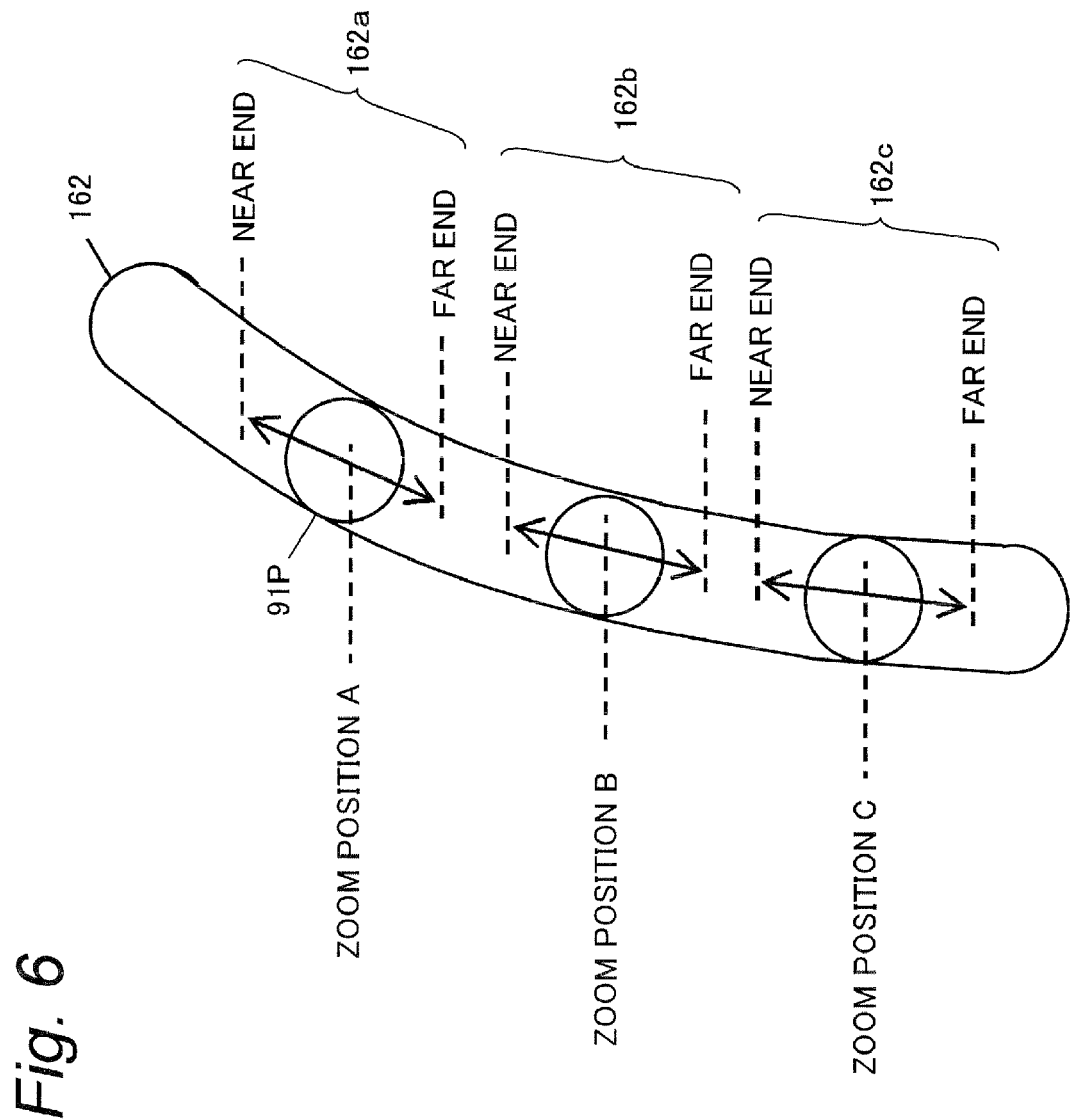

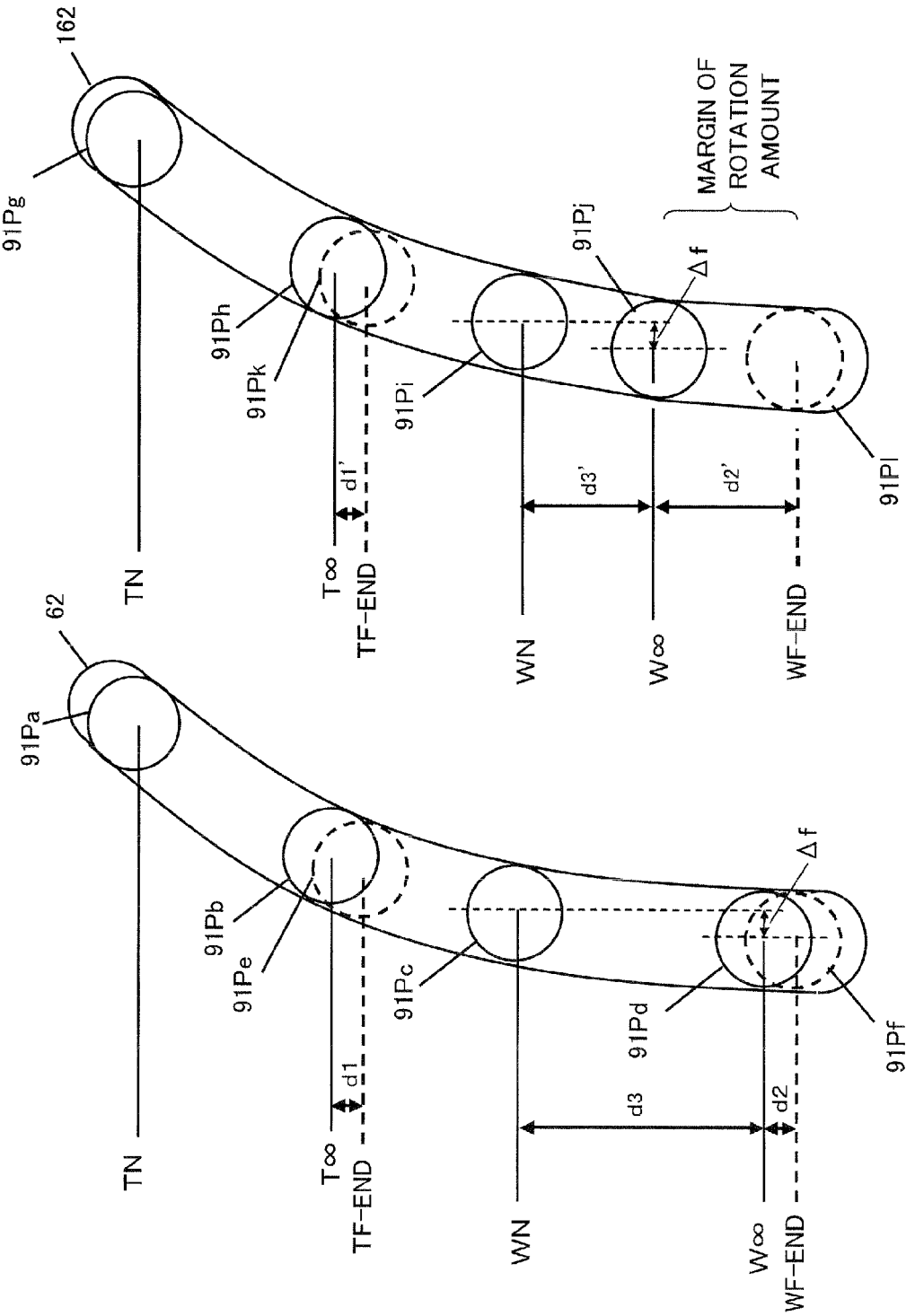

ZOOM LENS AND IMAGING APPARATUS INCLUDING FOCUS CAM FOR CONVERTING ROTATION AMOUNTS INTO FOCUS LENS GROUP MOVEMENT

BACKGROUND

1. Technical Field

The technical field relates to a zoom lens and an imaging apparatus suitable for contrast AF (Autofocus).

2. Related Art

In recent years, a digital single-lens reflex camera capable of converting an optical image of a subject into an electric image signal so as to record it to a recording medium such as a semiconductor memory. With such a digital single-lens reflex camera, a user can take a picture of a subject while viewing the subject through either of an optical finder and a liquid crystal display monitor provided to a rear side of the camera. When the user views the subject through the finder, light (namely, a subject image) incident on a lens is reflected by a reflection mirror arranged on an optical path after the lens so that the optical path is changed. Then the subject image is changed into an erected image through a pentaprism and is led to the optical finder, so that the user can view the subject image passing through the lens from the optical finder.

As the spread of digital single-lens reflex cameras among users, a small, light-weighted and inexpensive camera such as a compact camera is more demanded. However an optical system, including a reflection mirror and a view finder cause a problem in view of downsizing. Therefore, recently the digital single-lens camera appears, which is not provided with a reflection mirror to allow a subject image always to be imaged on an imaging sensor so that the user can take a picture while viewing the subject image through a liquid crystal display monitor or an electronic viewfinder provided on the rear side of the camera.

When a group of four lenses with high magnification are used as the zoom lens, speed and accuracy of focusing at the time of the zooming become a problem. The above digital single-lens camera employs contrast type autofocus ("contrast AF") which always uses an image signal from an imaging sensor which is being captured in real time, thus providing more accurately focusing than employing phase difference type autofocus.

Conventionally, the following mechanism is proposed (for example, see JP07-333482A). In this mechanism, a feed mechanism for feeding a focus lens in the group of four zoom lenses of an inner focus type in order to provide zoom tracking function mechanically, and a feed mechanism for feeding the focus lens for focusing are shared to be downsized, so that a focus operation can be performed smoothly on an entire zooming area. Further, another method is proposed (for example, see JP2-266312A), which calculates a movement of a focusing system with high accuracy and at high speed in a proper calculation method to realize electrically zoom tracking of the group of four zoom lenses.

FIGS. 13 to 15 are diagrams describing a configuration of a conventional zoom lens disclosed in JP7-333482A. A conventional zoom lens 100 shown in FIG. 13 includes a first lens-group 101 with positive refractive power, a second lens-group 102 with negative refractive power, a third lens group 103 with positive refractive power, and a fourth lens group 104 with positive or negative refractive power. As shown in FIG. 13, a zoom ring 110, a focus ring 120, a first lens-group moving frame 130, a first variable cam barrel 140, a direct advancing barrel 150, a first lens-group moving barrel 60, a fixed barrel 70 integral with a lens mount 105, a second variable cam barrel 80 and a second lens-group moving frame 90 are provided to a lens barrel 106 to be mounted to a camera body (not shown) with the lens mount 105, in this order generally from the outside.

The zoom ring 110 is connected to the second variable cam barrel 80 with a first connecting pin 111P, and rotates integrally with the second variable cam barrel 80. A focus operation sliding pin 121P is mounted to the focus ring 120 on a side of the lens mount 105, and rotates according to the rotation of the focus ring 120.

The first lens-group moving barrel 60 is provided with a third cam groove (focus cam) 62 of the second lens-group engaged with a second lens-group guide pin 91P, and a focus operation sliding pin guide groove 63 engaged with a focus operation sliding pin 121P. FIG. 14 illustrates a relationship among the third cam groove 62 of the second lens-group, the second lens-group guide pin 91P, and the focus operation sliding pin guide groove 63. The second variable cam barrel 80 is provided with a second lens-group guide groove 85 that is engaged with a second lens-group rotating pin 92P and transmits a rotational movement to the second lens-group rotating pin 92P (see FIG. 15).

Returning to FIG. 13, the second lens-group moving frame 90 is provided with the second lens-group guide pin 91P on the subject side and with the second lens-group rotating pin 92P to be engaged with the second lens-group guide groove 85 on the lens mount 105 side. The second lens-group guide pin 91P is engaged with the third cam groove 62 of the second lens-group. FIG. 15 illustrates a relationship among the second variable cam barrel 80, the second lens-group rotating pin 92P, the second lens-group guide groove 85, and the second lens-group guide pin 91P.

An operation of the zoom lens 100 will be described with reference to FIGS. 13 to 15.

When the zoom ring 110 rotates, the second variable cam barrel 80 rotates via the first connecting pin 111P. Due to the rotation of the second variable cam barrel 80, the third lens-group 103 is moved by the third lens group guide pin 103P engaged with a cam groove provided to the second variable cam barrel 80 and a cam groove provided to the fixed barrel 70.

The rotation of the second variable cam barrel 80 rotates and moves forward and backward the second lens-group moving frame 90 and the second lens-group guide pin 91P according to control of the second lens-group rotating pin 92P engaged with the second lens-group guide groove 85 and the second lens-group guide pin 91P engaged with a second cam groove 52 of the second lens-group provided to the straight advancing barrel 150. When rotating, the second lens-group guide pin 91P moves along the third cam groove 62 of the second lens-group. The other lens groups 101 and 104 similarly move in a predetermined manner according to the rotation of the zoom ring 110, so that the zoom operation according to a rotational angle of the zoom ring 110 is realized.

On the other hand, when the focus ring 120 rotates, this rotation is transmitted to the first lens-group moving barrel 60 via the focus operation sliding pin 121P and rotates the first lens-group moving barrel 60. The rotation of the first lens-group moving barrel 60 moves the first lens-group moving barrel 60 forward and backward due to the engagement between the second lens-group guide pin 91P and the third cam groove 62 of the second lens-group. As a result, the second lens-group 102 moves forward and backward.

In order to focus on an infinite (∞) subject in a hill-climbing contrast AF method, a down-hill area for detecting a peak, namely, an area for moving the focus lens group beyond infinity (∞) is necessary.

An AF evaluation value used for the contrast AF abruptly changes according the position of the focus lens when a zoom position is on a telephoto side. However, when the zoom position is on a wide-angle side, the AF evaluation value gently changes. For this reason, particularly when the zoom position is at a wide-angle end, the focus lens group should be moved in a wide range in order to detect a peak accurately.

A movable range of the focus lens group is restricted to a length of the third cam groove 62 of the second lens-group. Specifically, when the zoom position is at the wide-angle end and the subject distance is infinite (∞), an area close to an end of the third cam groove 62 of the second lens-group is used. In this state, the movable range of the first lens-group moving barrel 60 rotating in conjunction with the focus ring 120 is restricted, and the movable range of the focus lens group is restricted. For this reason, the focus lens group cannot be moved along a sufficiently long distance for down hill. That is, in the contrast AF, the focus lens cannot be moved in a distance necessary for obtaining the peak of the AF evaluation value. In other words, with conventional zoom lenses, the AF evaluation value cannot be accurately obtained, when the contrast AF is performed with the zoom position at the wide-angle end and the infinite (∞) subject distance.

SUMMARY

To solve the above problems, a zoom lens and an imaging apparatus are provided, that can move a focus lens in a sufficiently wide area upon contrast AF even when a zoom position is at a wide-angle end and a subject distance is infinite, and realize the contrast AF accurately.

In a first aspect, a zoom lens containing a plurality of lens groups including a focus lens group is provided. The zoom lens includes a focus cam operable to convert a first rotation amount provided by a focus operation into a movement of the focus lens group, and further converting, in addition to the first rotation amount, a second rotation amount provided by a zoom operation into a movement of the focus lens group, a zoom cam operable to convert the second rotation amount provided by the zoom operation into a movement of a predetermined lens group, a focus driving unit operable to rotate the focus cam by the first rotation amount, a zoom driving unit operable to rotate the zoom cam by the second rotation amount, and a focus cam follower engaged with the focus cam and operable to move in the focus cam. The zoom driving unit rotates the focus cam follower in the focus cam according to a rotation amount of the zoom driving unit so that the focus lens group is moved. The focus cam is configured so that a moving amount of the focus lens group corresponding to a unit rotation amount of the focus driving unit varies according to a rotational position of the zoom driving unit. A lift amount of the focus cam is defined by a cam curve so that a rotation amount of the focus driving unit from a far end position to an infinite position when the rotation position of the zoom driving unit is at a wide-angle end becomes larger than the rotation amount when the rotational position of the zoom driving unit is at a telephoto end.

With the above configuration, an over infinity margin area can be secured through the entire zoom area, so that accurate and high-speed contrast AF can be realized by a simple method.

Further, the zoom lens may further include a first detector operable to detect the rotation amount of the zoom driving unit, a second detector operable to detect the rotation amount of the focus driving unit, a data storage operable to store focus data which relates a position of the focus lens group in an in-focus state to a zoom position for at least two subject distances, a calculation unit operable to calculate a rotation amount of the focus driving unit which is necessary for maintaining an in-focus state for a current subject distance with reference to the focus data when the zoom driving unit is operated, and a focus cam driver operable to drive the focus cam by the calculated rotation amount.

With above configuration, when the zoom operation is performed in an in-focus state with the focus lens group focuses at any subject distance and any zoom position, the in-focus state can be continuously maintained.

Further, the lift amount of the focus cam may be defined by the cam curve so that when a subject distance is in a predetermined range, a rotational angle of the focus driving unit from the far end position to a focus position for the subject distance in the predetermined range is constant regardless of the rotational position of the zoom driving unit. This allows the driving of the focus lens group to be easily controlled.

Further, when a subject distance is within a predetermined range, the focus cam driver does not operate.

In a second aspect, an imaging apparatus to which the zoom lens is mountable or included, which contains an imaging unit operable to capture a subject to generate an image signal, a focus detector operable to detect a focus state based on the image signal, and a controller operable to control the focus driving unit to rotate the focus cam based on a current rotational position of the focus driving unit and the focus state detected by the focus detector.

Accordingly, hill-climbing contrast AF is enabled even in a combination of a high magnification zoom lens and a digital single-lens camera, and the focus movement due to the zoom can be reduced to a level of close zero in practical use.

According to the aforementioned aspect, a distance (rotation margin) on the focus cam, from a position corresponding to an infinite position (W∞) to a position corresponding to a far end position (WF end) can be sufficiently secured even when the zoom position is at the wide-angle end. Therefore, the high-magnification zoom lens and the imaging apparatus can be provided, that can perform accurate and high-speed contrast AF in a simple method over the entire zoom area.

BRIEF DESCRIPTION OF DRAWINGS

FIGS. 5A to 5C are diagrams illustrating a mechanism section of a zoom lens of the digital camera.

FIG. 6 is a diagram describing a movable range of a focus pin (second lens-group guide pin) in a focus cam (third cam groove for second lens-group) in each zoom position.

FIG. 7A is a diagram illustrating a relationship between a focus cam and a focus cam pin (focus cam follower) of a conventional digital camera, and FIG. 7B is a diagram illustrating a relationship between a focus cam and a focus cam pin of the digital camera according to the embodiment.

DETAILED DESCRIPTION OF PREFERRED EMBODIMENTS

A preferred embodiment will be described below with reference to the drawings. It should be noted that like components are denoted by like symbols.

Figure 1:
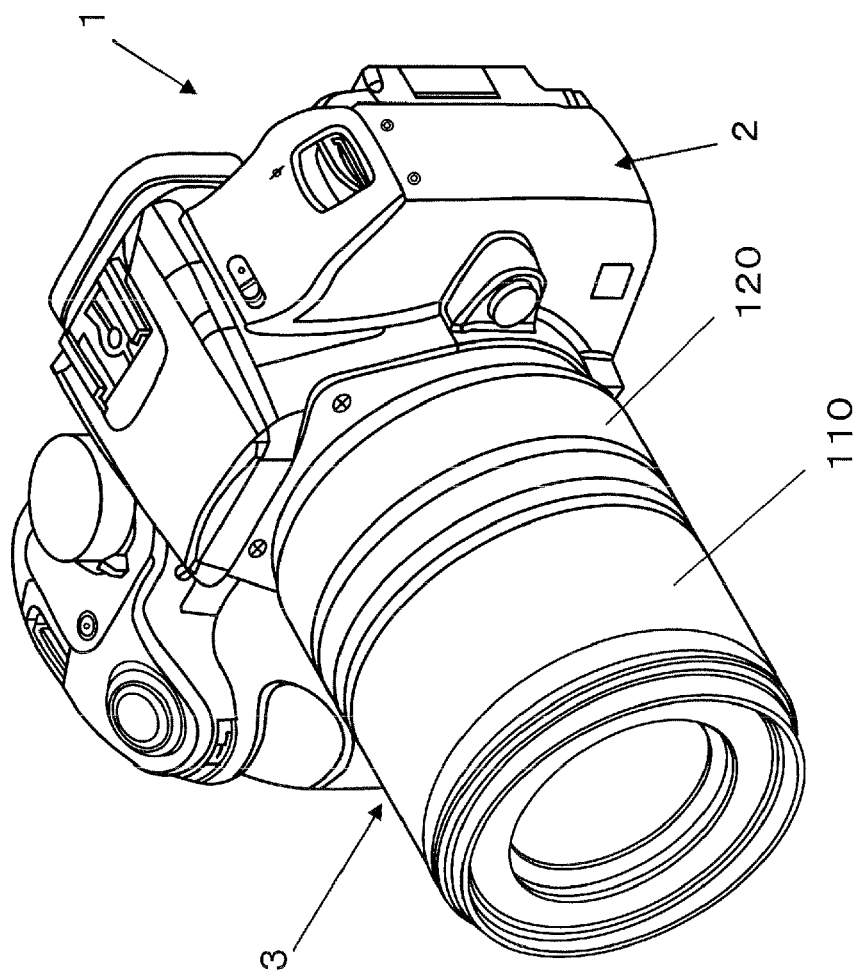
FIG. 1 is a perspective view when viewed from a front side of a lens interchangeable digital camera according to one embodiment.

FIG. 1 is a perspective view illustrating a front side of a single-lens digital camera 1 according to an embodiment. The digital camera 1 according to the present embodiment includes a camera body 2, and an interchangeable zoom lens 3 mountable to the camera body 2 and having a zoom ring 110 and a focus ring 120.

Figure 2:
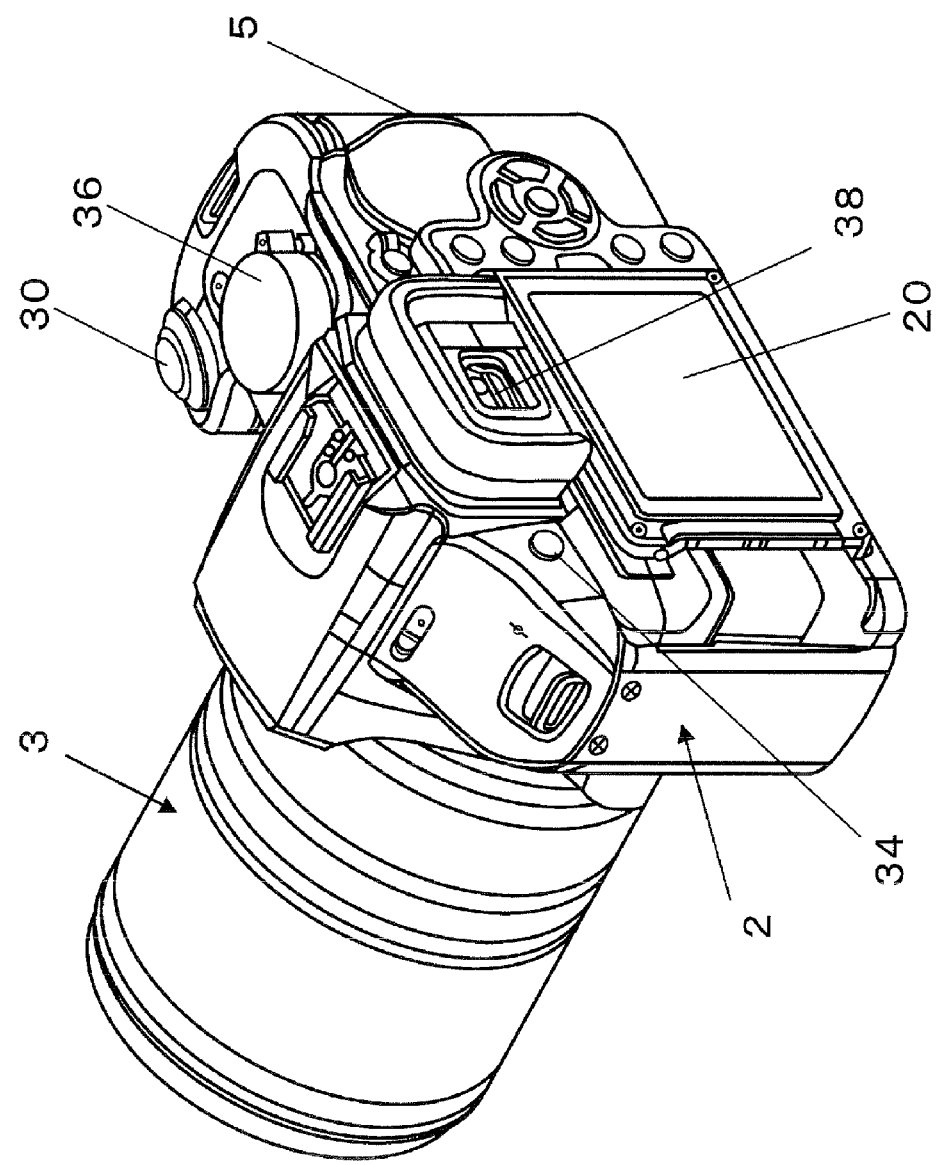
FIG. 2 is a perspective view when viewed from a rear side of the digital camera.

FIG. 2 is a perspective view illustrating a rear side of the digital camera 1. The rear side of the camera body 2 is provided with an electronic viewfinder 38 and a liquid crystal display monitor 20. A release button 30 and a mode switching dial 36 are provided to an upper right portion of the camera body 2, and a recording mode switching button 34 is provided to an upper left portion of the rear side of the camera body 2.

The recording mode switching button 34 is a member to be operated for switching between a mode which allows a user to record an image while viewing it through the electronic viewfinder 38 and a mode which allows a user to record an image while viewing it on the liquid crystal display monitor 20.

When the release button 30 is half pressed, an autofocus function operates. When the release button 30 is fully pressed, image data based on an image signal output from an imaging sensor is recorded to a memory card (not shown) inserted into a memory card slot 5.

The mode switching dial 36 is a member to be operated for switching between a recording mode for recording a subject and a playback mode for reproducing the image data stored in the memory card and displaying the image data on the liquid crystal display monitor 20 or the electronic viewfinder 38.

The zoom lens 3 images a subject image on the imaging sensor. The imaging sensor outputs an image signal corresponding to the subject image.

1. Entire Configuration of Digital Camera

A configuration and an operation of the digital camera 1 according to the present embodiment will be described with reference to FIGS. 3 and 4.

Figure 3:
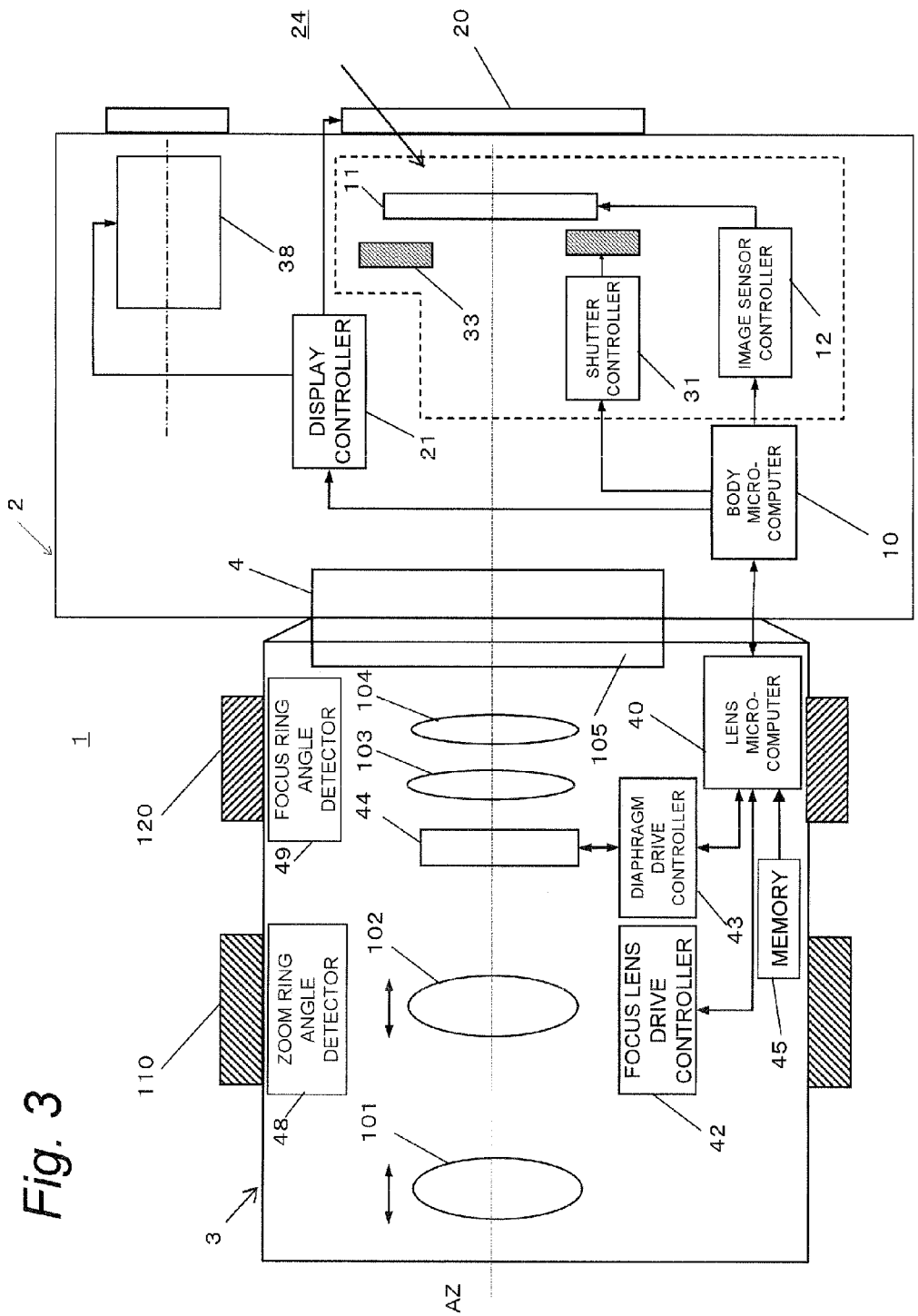
FIG. 3 is a block diagram illustrating an entire configuration of the digital camera.
Figure 4:
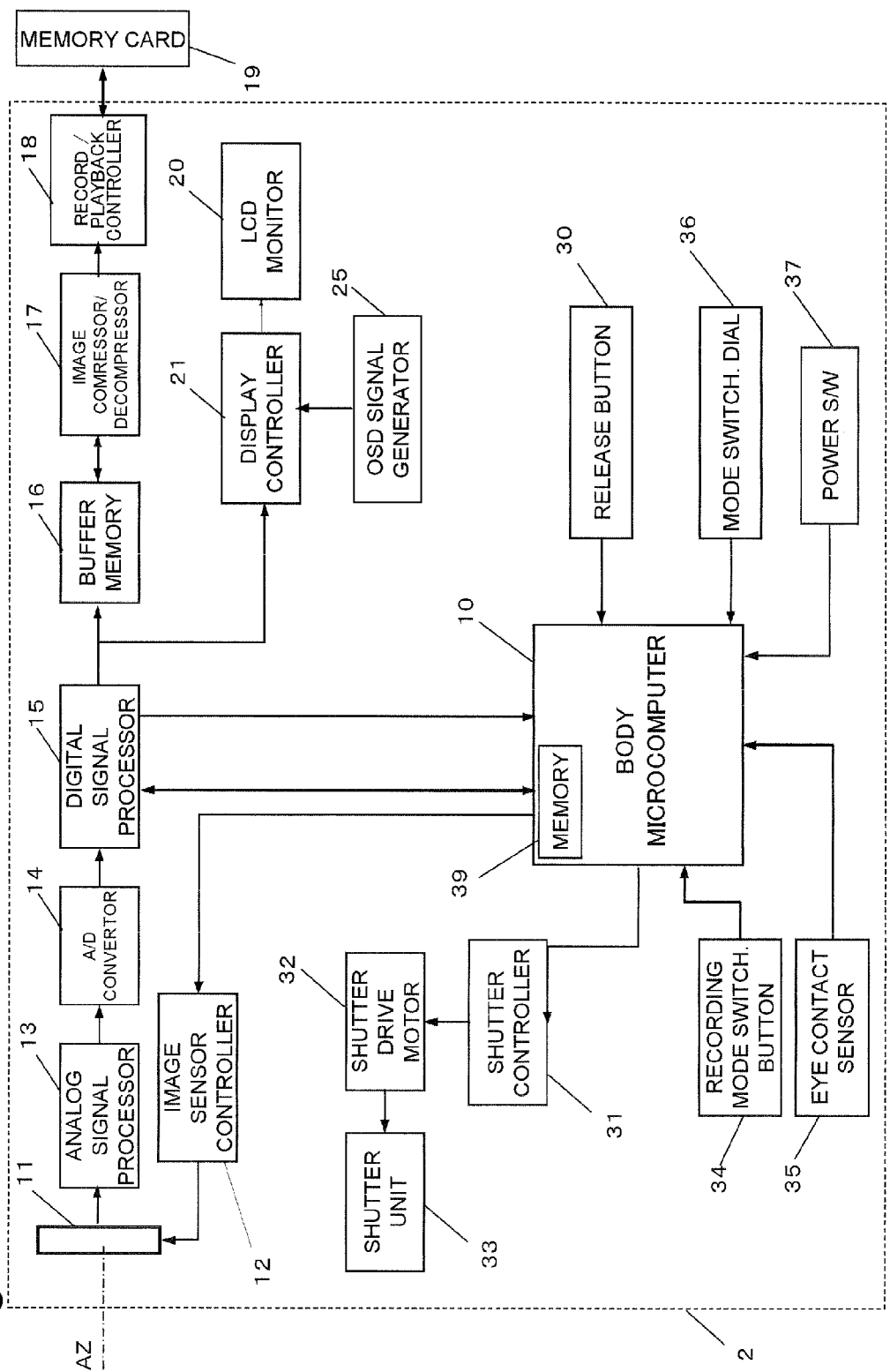
FIG. 4 is a block diagram illustrating an internal configuration of a camera body of the digital camera.

FIG. 3 is a block diagram illustrating the entire configuration of the digital camera 1 according to the present embodiment, and FIG. 4 is a block diagram illustrating an internal configuration of the camera body 2.

As shown in FIG. 3, the digital camera 1 includes the camera body 2 and the zoom lens 3 mountable to the camera body 2. The zoom lens 3 is attached to a body mount 4 provided to the camera body 2 via the lens mount 105.

2. Configuration of Camera Body

The configuration of the camera body 2 will be described with reference to FIGS. 3 and 4. The camera body 2 mainly includes an imaging unit 24 for capturing a subject image, a body microcomputer 10 for controlling operations of respective units such as the imaging section 24, the liquid crystal display monitor 20 for displaying the captured image and various information, the electronic viewfinder 38 by which a user can visually recognizes a subject image, and an image storage unit (not shown) for storing data of the captured image.

The imaging unit 24 mainly includes an imaging sensor for performs photoelectric conversion, a shutter unit 33 for regulating exposure time of the imaging sensor 11, a shutter controller 31 for controlling drive of the shutter unit 33 based on a control signal from the body microcomputer 10, and an imaging sensor controller 12 for controlling an operation of the imaging sensor 11. Further, the digital camera 1 has a contrast AF function performed based on image data generated by the imaging sensor 11. The use of the contrast AF can realize an accurate focus operation, for the digital camera.

The imaging sensor 11 is, for example, a CCD (Charge Coupled Device) that converts an optical image formed by an imaging optical system into an electric image signal. The imaging sensor 11 is controlled by a timing signal generated by the imaging sensor controller 12. The imaging sensor 11 may be a CMOS (Complementary Metal Oxide Semiconductor) sensor, or other devices having a function for capturing an image.

The body microcomputer 10 is a control device that controls a central function of the camera body 2, and controls various sequences. Specifically, the body microcomputer 10 includes a CPU, a ROM and a RAM. A program stored in the ROM is read into the CPU so that the body microcomputer 10 can realize various functions. For example, the body microcomputer 10 has a function for detecting attachment of the zoom lens 3 to the camera body 2, or a function for acquiring information absolutely necessary for controlling the digital camera 1 from the zoom lens 3, such as focal distance information and various correcting information of the zoom lens 3, and making control based on such information.

The body microcomputer 10 can receive signals of power switch 37, the release button 30, the mode switching dial 36 and the recording mode switching button 34 (see FIG. 4). Various pieces of information about the camera body 2 are stored into a memory 39 in the body microcomputer 10.

The body microcomputer 10 controls the entire digital camera 1 including the imaging sensor 11 and other units, according to an instruction from the member to be operated such as the release button 30.

The body mount 4 can be mechanically or electrically connected to the lens mount 105 of the zoom lens 3. The body microcomputer 10 and a lens microcomputer 40 transmits and receives a signal necessary for each other via the body mount 4 and the lens mount 105. Further, power from a power supply unit (not shown) is supplied from the body mount 4 to the entire zoom lens 3 via the lens mount 105.

The image signal output from the imaging sensor 11 is converted into image data through an analog signal processor 13, an A/D converter 14 and a digital signal processor 15, and is temporarily stored in a buffer memory 16. The analog signal processor 13 executes an analog signal processing such as a gamma process on the image signal outputted from the imaging sensor 11. The A/D converter 14 converts an analog signal outputted from the analog signal processor 13 into a digital signal. The digital signal processor 15 executes a digital signal processing such as noise reduction and edge enhancement on the image data converted into the digital signal by the A/D converter 14. Further, in order to perform the contrast AF, the image data that has been subjected to the digital signal process is captured into the body microcomputer 10. The operation of the contrast AF will be described in detail later.

The buffer memory 16 is a RAM (Random Access Memory), and temporarily stores image data. The image data read from the buffer memory 16 is converted into compressed image data of smaller data size than that of the original data by an image compressor/decompressor 17 according to, for example, a JPEG (Joint Photographic Experts Group) system. Thereafter, a record/playback controller 18 converts the compressed image data into a recording format of a memory card 19 so as to record the converted data. This recording format is, for example, an Exif (registered trademark) format or a format similar to the Exif (registered trademark) format. In such a recording format, capturing information including a date on which an image is captured, a focal distance, a shutter speed, an iris value and a recording mode is recorded together with the image data.

On the other hand, at the time of the play back mode, the compressed image data recorded in the memory card 19 is reproduced from the memory card 19 and decompressed into the original image data by the image compressor/decompressor 17 via the record/playback controller 18 so as to be temporarily stored in the buffer memory 16.

The liquid crystal display monitor 20 displays the image data outputted from the digital signal processor 15 or the buffer memory 16 as a visible image. A display controller 21 converts the image data into a display image format for the liquid crystal display monitor 20. Display mode of the liquid crystal display monitor 20 includes a mode for displaying only image data as a visible image, and a mode for displaying, as a visible image, image data as well as recording information composed of text and graphic data generated by an OSD (On Screen Display) signal generator 25.

3. Configuration of Zoom Lens

An outline of the configuration of the zoom lens 3 will be described with reference to FIG. 3. As shown in FIG. 3, the zoom lens 3 is an optical system for imaging a subject image on the imaging sensor 11 in the digital camera 1, and is composed of four groups of inner focus zoom lenses including a first lens-group 101, a second lens-group 102, a third lens group 103 and a fourth lens group 104.

The zoom lens 3 further includes the zoom ring 110 for adjusting a zoom amount, and a zoom ring angle detector 48 for detecting a rotational angle of the zoom ring 110. The zoom lens 3 further has a focus ring 120 for moving the focus lens group (second lens-group) 102 for focusing, and a focus ring angle detector 49 for detecting a rotational angle of the focus ring 120. The zoom lens 3 further has a focus lens drive controller 42 for rotate the focus ring 120 (namely, third cam groove 162 for the second lens-group) in the contrast AF, a diaphragm drive controller 43 for driving an diaphragm unit 44 to regulate a diaphragm diameter, and the lens microcomputer 40 as a lens controller for controlling the operation of the zoom lens 3. The focus lens drive controller 42 includes, for example, an ultrasonic actuator.

The zoom ring 110 is rotatable so that the zoom position is changed from a wide-angle end to a telephoto end. The focus ring 120 is rotatable so that the focus lens group is moved from a far end to a near end (nearest end). The far end in the present embodiment is a farthest position where the focus lens group can be mechanically moved, and is different from an optical position where the focus lens group focuses on an infinite subject.

The lens microcomputer 40 is a control device that controls the respective function units mounted to the zoom lens 3, and is connected to the respective function units. Specifically, the lens microcomputer 40 includes a CPU, a ROM and a RAM. Programs stored in the ROM are read into the CPU so that the various functions can be realized. Further, the body microcomputer 10 is electrically connected to the lens microcomputer 40 via terminals (not shown) provided to the lens mount 105 so that information can be communicated between them.

The zoom lens 3 further has a memory 45 which stores information specific to the zoom lens 3 (such as serial number, and information for various characteristics). The memory 45 stores therein, for example, information about a focusing curve representing a relationship between a focus lens position and a zoom lens position (for example, table information representing the relationship between the position of the focus lens group and the zoom position in the focused state). The information about the focusing curve is given for a plurality of (at least two) subject distances.

4. Autofocus Operation

The operation of the contrast AF of the digital camera 1 will be described below. When the contrast AF operation is performed, the body microcomputer 10 requests the lens microcomputer 40 to send data for the contrast AF. The data for the contrast AF is data necessary for operation of the contrast AF, and includes, for example, a focus drive speed, a focus shift amount, an image magnification, and information about contrast AF availability. The digital camera 1 according to the present embodiment can also perform manual focus. The autofocus operation will be described below.

The body microcomputer 10 monitors whether the release button 30 is half pressed. When the release button 30 is half pressed, the body microcomputer 10 sends an autofocus start command to the lens microcomputer 40. In response to this, the lens microcomputer 40 controls the focus lens drive controller 42. The body microcomputer 10 calculates an evaluation value ("AF evaluation value") for the contrast AF based on the received image data. For example, a brightness signal is obtained from the image data generated by the imaging sensor 11, and high-frequency components of the brightness signal in the image are integrated to obtain the AF evaluation value. The body microcomputer 10 then obtains a peak of a contrast value based on the AF evaluation value to monitor whether a focus point can be extracted. Specifically, a position of the second lens-group 102 at which the AF evaluation value becomes maximum is extracted as the focus point.

Thereafter, when the release button 30 is fully pressed by the user or the like, the diaphragm drive controller 43 drives the diaphragm unit 44 to cause an aperture value to be equal to a value calculated based on an output from a ranging sensor (not shown). At the same time, the imaging sensor driving controller 12 exposes the imaging sensor 11 for time of a shutter speed calculated based on an output from a photometric sensor (not shown).

After the completion of the exposure, the image data from the imaging sensor 11 is subjected to a predetermined image process, and then the image data is output to the image display controller 21. As a result, the captured image is displayed on the liquid crystal display monitor 20. Further, the image data is stored in the memory card 19 via the record/playback controller 18.

5. Mechanism of Zoom Lens

Figure 13:
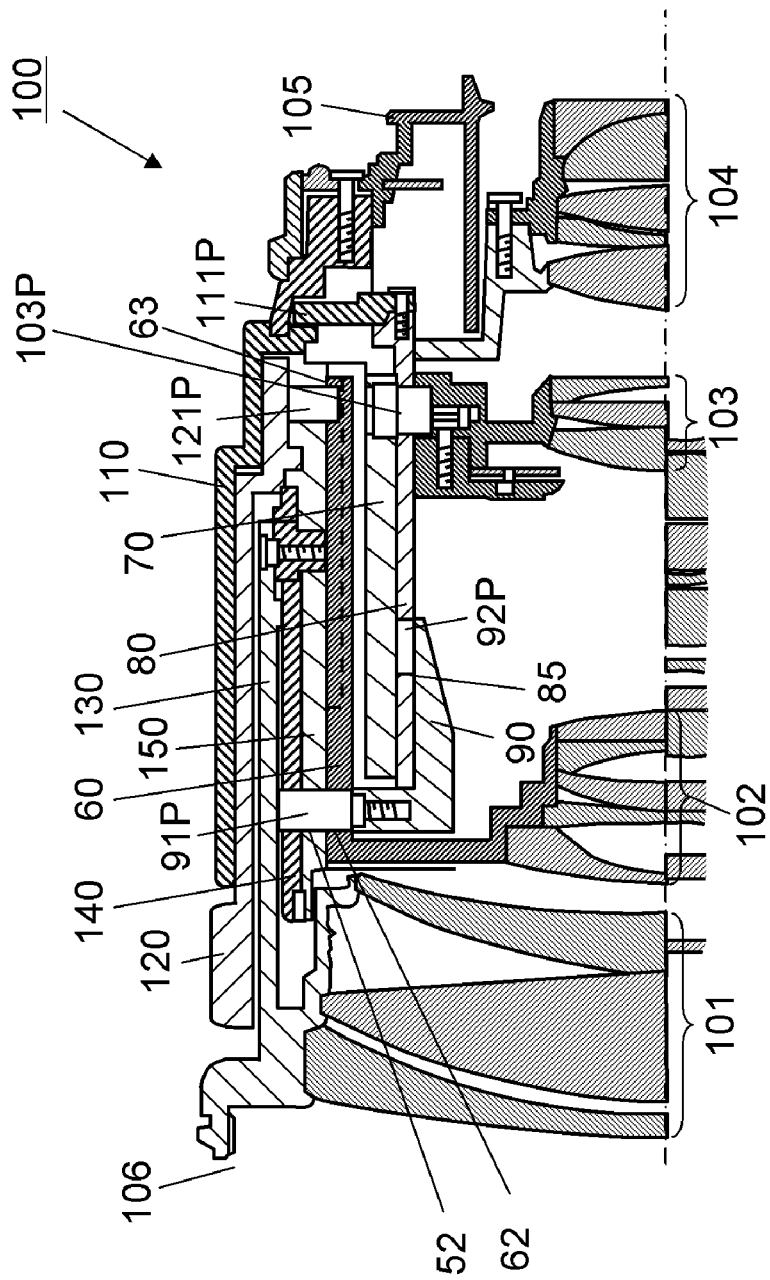
FIG. 13 is a diagram illustrating a configuration of a conventional zoom lens available for the digital camera according to the embodiment.
Figure 15:
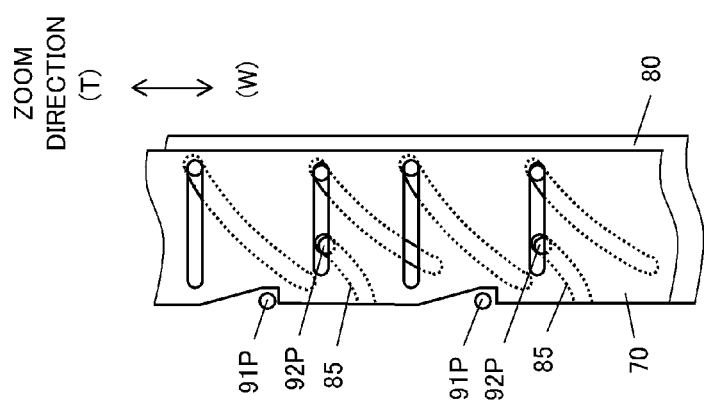
FIG. 15 is a diagram illustrating a relationship among a second variable cam barrel, a second lens-group rotating pin, a second lens-group guide groove, and the second lens-group guide pin of the conventional zoom lens, which are available for the digital camera according to the embodiment.
Figure 14:
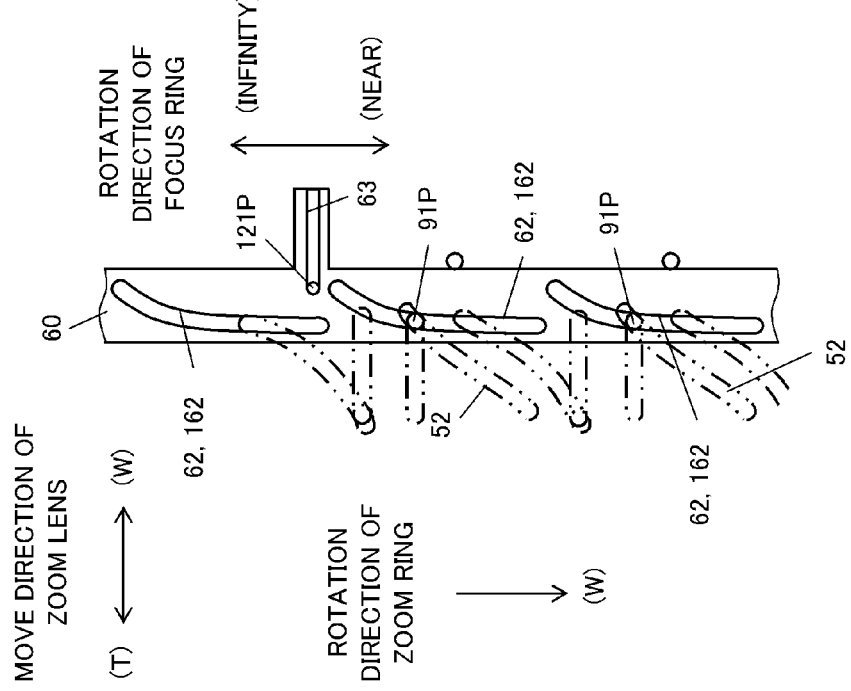
FIG. 14 is a diagram illustrating a relationship among a third cam groove (focus cam) for a second lens-group, a second lens-group guide pin (focus cam pin), and a focus operation sliding pin guide groove of the conventional zoom lens, which are available for the digital camera according to the embodiment.

A mechanism and an operation of the zoom lens 3 according to the present embodiment will be described. FIGS. 5A to 5C are diagrams describing the mechanism of the zoom lens 3 of the digital camera 1 according to the present embodiment. The mechanism of the zoom lens 3 of the digital camera 1 according to the present embodiment is same as that of the conventional zoom lens shown in FIGS. 13 to 15 except for some parts. FIGS. 5A to 5C are diagrams each illustrating only main portions of the configuration shown in FIGS. 13, 14 and 15 respectively. As to the zoom lens 3 according to the present embodiment, a shape of the third cam groove 162 for the second lens-group ("focus cam") provided to the first lens-group moving barrel 60 is different from that of the conventional art, and the other parts of the configuration are same. Therefore, like members are denoted by like reference sings in the drawings, and detailed description thereof is not given.

An operation of the focus cam (third cam groove for the second lens-group) 162 according to the present embodiment will be described with reference to FIGS. 5A to 5C and FIG. 13.

First, the operation when the zoom ring (zoom driving unit) 110 is rotated will be described. When the zoom ring 110 rotates, the second variable cam barrel 80 rotates with the first connecting pin 111P. The rotation of the second variable cam barrel 80 rotates and moves forward and backward the second lens-group moving frame 90 and the second lens-group guide pin 91P (referred to as "focus cam pin") according to the control of the second lens-group rotating pin 92P engaged with the second lens-group guide groove ("zoom cam") 85 and the second lens-group guide pin 91P ("focus cam follower") engaged with a second cam groove 52 of the second lens-group provided to the straight advancing barrel 150. When the focus cam pin 91P rotates, the focus cam pin 91P moves along the focus cam 162. That is, when a certain zoom position is determined, the focus cam pin 91P moves along a partial area corresponding to the zoom position in the focus cam 162. For example, as shown in FIG. 6, when the zoom position is a position A and the focus ring 120 is rotated between the near end position and the far end position, the focus cam pin 91P moves in a range of the area 162a according to the focus position. Similarly, when the zoom position is a position B and a position C, the focus cam pin 91P moves in ranges of an area 162b and an area 162c, respectively, according to the focus position.

An operation when the focus ring (focus driving unit) 120 is rotated will be described below. When the focus ring 120 rotates, the rotation is transmitted to the first lens-group moving barrel 60 via the focus operation sliding pin 121P so that the first lens-group moving barrel 60 rotates. The rotation of the first lens-group moving barrel 60 moves the first lens-group moving barrel 60 forward and backward due to the engagement between the focus cam pin 91P and the focus cam 162. As a result, the second lens-group (referred to as "focus lens group") 102 moves forward and backward. In this manner, the user can operate the focus ring 120 to move the focus lens group (second lens-group) 102 and bring those lenses into focus.

In FIGS. 7A and 7B, a relationship between the focus cam 162 and the focus cam pin 91P provided to the first lens-group moving barrel 60 according to the present embodiment is compared with that of the conventional art. FIG. 7A illustrates the focus cam 62 of the conventional art, and FIG. 7B illustrates the focus cam 162 according to the present embodiment.

Figure 8:
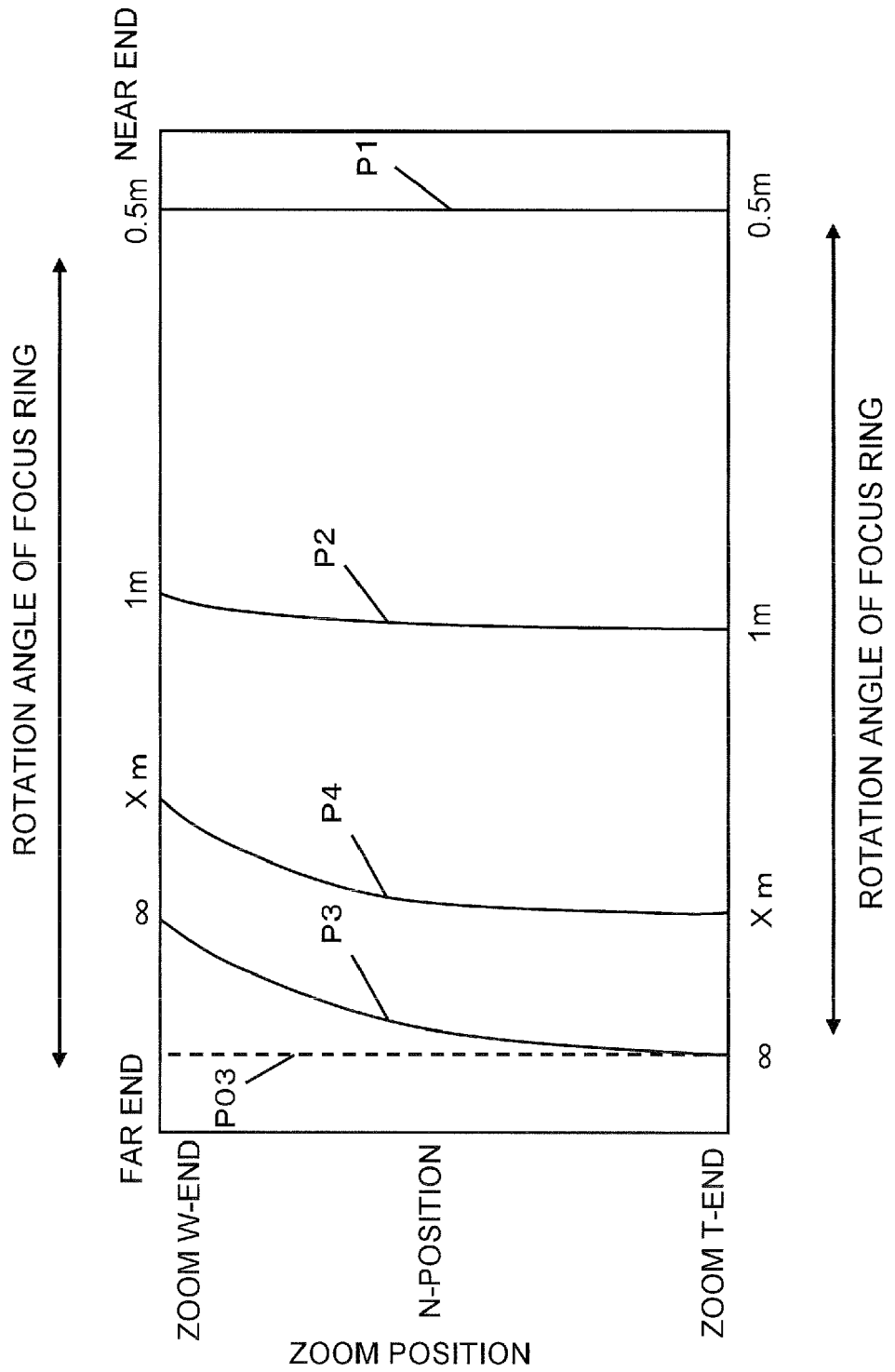
FIG. 8 is a diagram illustrating a focusing curve of the zoom lens of the digital camera.

FIG. 8 is a diagram illustrating a focusing curve of the zoom lens 3 of the digital camera 1 according to the present embodiment. In FIG. 8, a horizontal axis represents the rotational angle of the focus ring 120 (the third cam groove 162 for the second lens-group), and a vertical axis represents the zoom position (focal distance). In FIG. 8, the focus position of the focus lens group (second lens-group) 102 is represented by the rotational angle of the focus ring 120, in which the focus lens group 102 is moved from the wide-angle end of the zoom (referred to as "zoom W-end"), providing the shortest focal distance, to the telephoto end of the zoom (referred to as "zoom T-end"), providing the longest focal distance, for the subject distances of 0.5 m (the nearest), 1 m, X m and infinity (∞). A lift amount of the focus cam 162 according to the present embodiment is set so that the focusing curve shown in FIG. 8 is obtained. Further, the data of the focusing curve shown in FIG. 8 is stored in the memory 45.

5.1 Focus Cam

The focus cam (third cam groove for the second lens-group) 162 according to the present embodiment will be described below. In FIGS. 7A and 8B, a vertical direction is a rotating direction of the zoom ring 110 and the focus ring 120, and a lateral direction is a moving direction of the lens groups. An upper part in FIGS. 7A and 7B is a direction of the telephoto end of the zoom operation, and a lower part is a direction of the wide-angle end.

Prior to the description about the focus cam 162 according to the present embodiment, the conventional focus cam (third cam groove for the second lens-group) 62 shown in FIG. 7A will be described.

In an in-focus state with the nearest (N) subject distance at the zoom T-end, when the zoom ring 110 is rotated from the zoom T-end to the zoom W-end, the second lens-group guide pin 91P moves from a position 91Pa to a position 91Pc in the third cam groove 62 of the second lens-group according to the rotation amount. Similarly, when the zoom ring 110 is rotated from the zoom T-end to the zoom W-end in an in-focus state with the infinite (∞) subject distance at the zoom T-end, the second lens-group guide pin 91P moves from a position 91Pb to a position 91Pd according to the rotation amount.

When the focus ring 120 is rotated in order to focus on a subject of which distance changes from nearest distance to infinity at the zoom T-end, the first lens-group moving barrel 60 rotates according to the rotation amount of the focus ring 120, and thus the second lens-group guide pin 91P moves from the position 91Pa to the position 91Pb. Similarly, when the focus ring 120 is rotated in order to focus on a subject of which distance changes from nearest distance to infinity at the zoom W-end, the first lens-group moving barrel 60 rotates according to the rotation amount of the focus ring 120, and thus the second lens-group guide pin 91P moves from a position 91Pc to a position 91Pd.

At this time, a moving amount of the focus ring 120 (rotation margin) from an infinite position (T∞) at the zoom T-end to far end position (TF end), namely, a distance d1 from a position 91Pb to a position 91Pe is equal to a rotation margin of the focus ring 120 from the infinite position (W∞) to a far end position (WF end) at the zoom W-end, namely, a distance d2 from a position 91Pd to a position 91Pf. In other words, in the conventional zoom lens 100, as shown by a focusing curve P03 in FIG. 8, even when the zoom position, that is, the rotation amount of the zoom ring 110 is changed from the zoom T-end to the zoom W-end, the rotational angle of the focus ring 120 is still constant.

That is, as to the conventional focus cam 62, a lift amount by a cam curve of the focus cam 62 is set so that an in-focus state is kept with the constant rotational angle of the focus ring 120 when the zoom position is changed from the zoom T-end to the zoom W-end. In other words, in the conventional focus cam 62, as shown by a broken line A in FIG. 9, the lift amount of the cam is set so that the moving amount of the first lens-group moving barrel 60 (namely, the focus lens group 102) becomes constant per unit rotation amount of the zoom ring 110 regardless of the zoom position. As a result, with the conventional focus cam 62, when the zoom ring 110 is rotated by the same amount, the first lens-group moving barrel 60, that is, the focus lens group 102 moves by the same amount regardless whether the zoom position is at the wide-angle end or the telephoto end.

Figure 9:
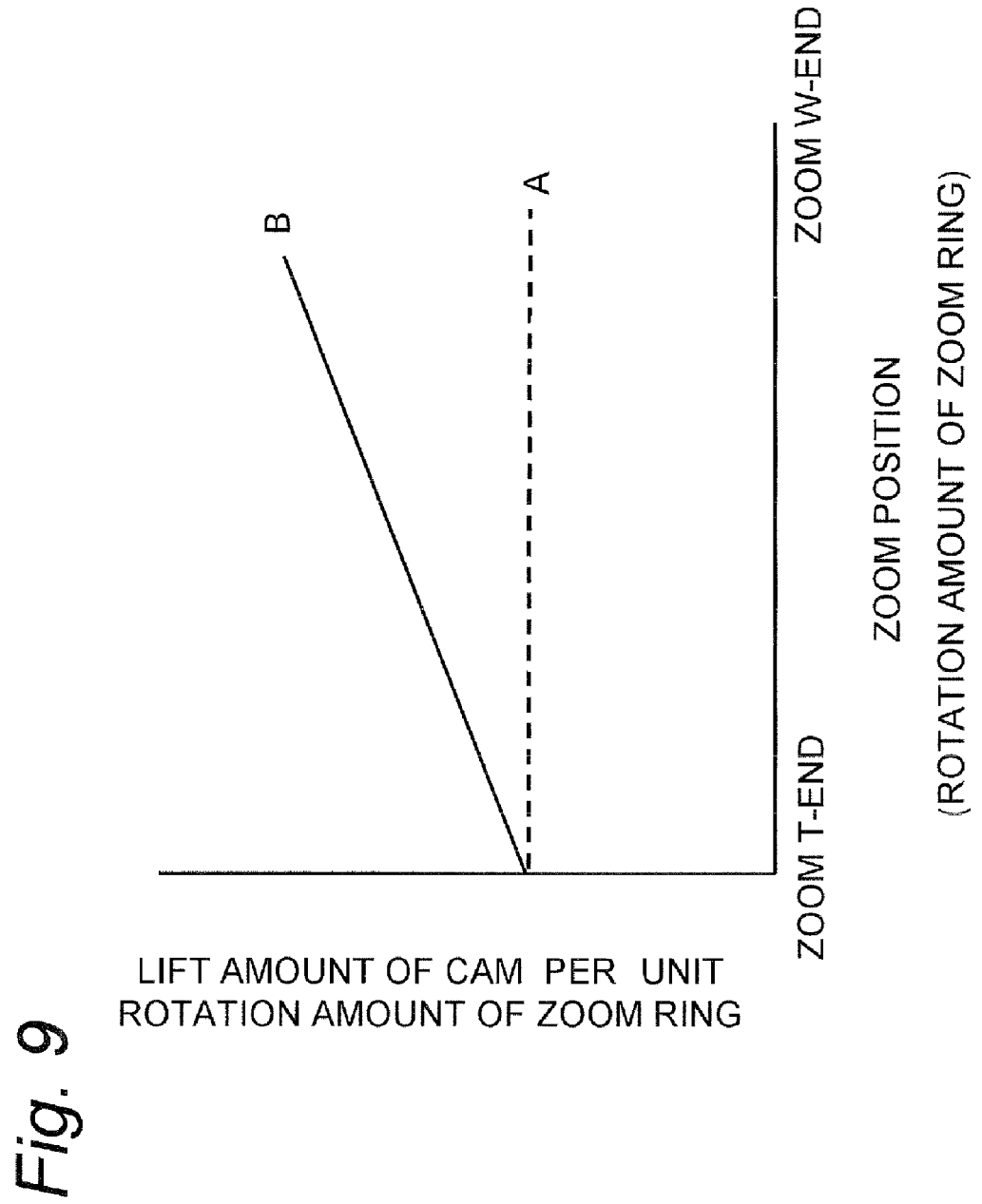
FIG. 9 is a diagram describing a lift amount of the focus cam per unit rotation amount of a zoom ring (namely, a moving amount of the focus lens group), with respect to the zoom position.

On the contrary, by the focus cam 162 according to the present embodiment, as shown by a solid line B in FIG. 9, the lift amount of the cam is set so that the moving amount of the first lens-group moving barrel 60 (namely, focus lens group 102) per unit rotation amount of the zoom ring 120 becomes larger as the zoom position is closer to the wide-angle side. That is, according to the focus cam 162 of the present embodiment, when the zoom ring 120 is rotated by the same amount, the focus lens group 102 moves by larger amount when the zoom position is at the zoom W-end than when the zoom position is at the zoom T-end.

The operation of the focus cam 162 according to the present embodiment will be specifically described below with reference to FIG. 7B.

When the zoom ring 110 is rotated from the zoom T-end to the zoom W-end while keeping an in-focus state at the zoom T-end with the nearest subject distance (N), the focus cam pin 91P moves from a position 91Pg to a position 91Pi in the focus cam 162 according to the rotation amount. Similarly, when the zoom ring 110 is rotated from the zoom T-end to the zoom W-end in an in-focus state on an infinite ($\infty$) subject at the zoom T-end, the second lens-group guide pin 91P moves from a position 91Pk (position T$\infty$) to a position 91Pj (position W$\infty$) according to the rotation amount.

When the focus ring 120 is rotated in order to focus on an infinite ($\infty$) subject in an in-focus state at the zoom T-end with the nearest subject distance (near end), the first lens-group moving barrel 60 rotates according to the rotation amount. As a result, the focus cam pin 91P moves from a position 91Pg (position TN) to a position 91Ph (position T$\infty$).

Similarly, when the focus ring 120 is rotated in order to focus on an infinite ($\infty$) subject in an in-focus state at the zoom W-end with the nearest subject distance (near end), the first lens-group moving barrel 60 rotates according to the rotation amount. As a result, the focus cam pin 91P moves from a position 91Pi (position WN) to a position 91Pj (position W$\infty$).

According to the focus cam 162 of the present embodiment, as shown in FIG. 7B, the infinite position (W$\infty$) of the zoom W-end is located higher than that of the conventional focus cam 62 shown in FIG. 7A, so that the rotational angle of the focus ring 120 from the infinite position (W$\infty$) of the zoom W-end to the WF end position (rotation allowance amount) can be sufficiently secured. That is, a moving amount d3' from the position WN to the position W$\infty$ is smaller than a moving amount d3 of the conventional focus cam 162 shown in FIG. 7A. This is because according to the focus cam 162 of the present embodiment, the lift amount of the focus cam 162 is set so that the moving amount of the focus lens group 102 by a curve of the focus cam 162 per unit rotation amount of the zoom ring 120 becomes larger as the curve is closer to the wide-angle side. As a result, according to the focus cam 162 of the present embodiment, the rotation margin at the zoom W-end (namely, a distance d2' from the position 91Pj (W$\infty$) to the position 91P1 (WF end)) becomes larger than the rotation margin at the zoom T-end (namely, a distance d1' from the position 91Ph to the position 91Pk).

That is, the lift amount due to the curve of the focus cam 162 according to the present embodiment is set as shown by a focusing curve P3 shown in FIG. 8. In this setting, when the rotation amount (focus distance) of the zoom ring 110 is changed from the zoom T-end towards the zoom W-end with the subject distance being infinite ($\infty$), the rotational angle of the focus ring 120 changes in order to maintain the in-focus state. A change amount of the rotational angle of the focus ring 120 becomes larger towards the zoom W-end. In other words, the rotation amount (rotation margin) of the focus ring 120 from the far end position to the infinite position when the rotation position of the zoom ring 110 is at the zoom W-end (wide-angle end) is larger than the rotation amount (rotation margin) when the rotation position of the zoom ring 110 is at the zoom T-end (telephoto end).

According to the above configuration of the focus cam 162, when focusing on the subject of which distance is infinite ($\infty$) in the hill-climbing contrast AF method, an area exceeding the infinite position that is necessary for downhill, namely, a distance from the far end to the focus point position ("the rotation margin" or an "over infinity margin" of the focus ring 120) can be secured sufficiently at the zoom W-end. This will be described in more detail below with reference to FIGS. 10A. to 10C.

Figure 10B:
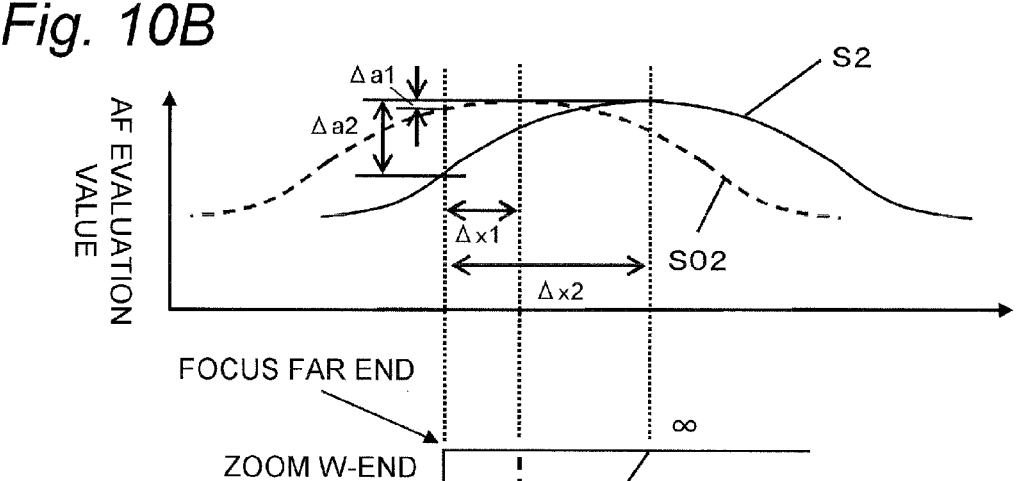
FIG. 10B is a diagram illustrating a curve of an AF evaluation value obtained when the zoom position is at a wide-angle end and a subject distance is at infinite.
Figure 10A:
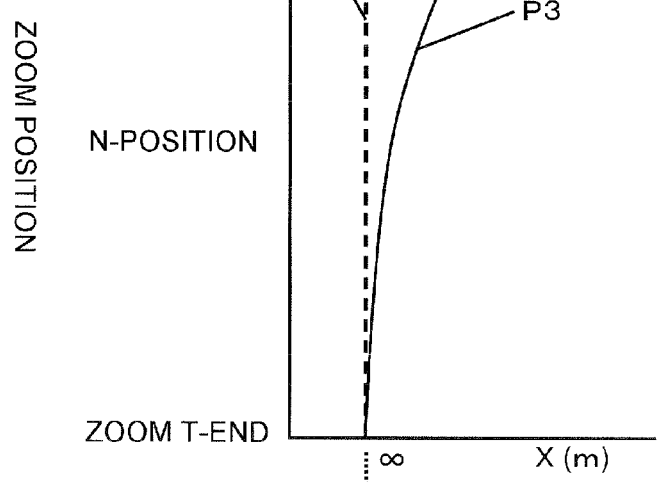
FIG. 10A is a diagram illustrating a focusing curve of the zoom lens of the digital camera.
Figure 10C:
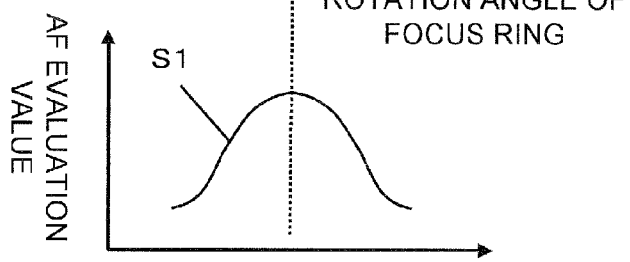
FIG. 10C is a diagram illustrating a curve of the AF evaluation value obtained when the zoom position is at a telephoto end and the subject distance is at infinite.

FIG. 10A is a diagram illustrating the focusing curve P3 of the zoom lens 3, shown in FIG. 8, when the subject distance is infinite ($\infty$). FIG. 10B is a diagram illustrating a change in an AF evaluation value in the case where the subject distance is infinite ($\infty$) and the zoom position is at the W end. FIG. 10C is a diagram illustrating a change in an AF evaluation value in the case where the subject distance is infinite ($\infty$) and the zoom position is at the T end. In FIGS. 10B and 10C, a horizontal axis represents a rotational angle of the focus ring 120 (third cam groove 162 for the second lens-group) and a vertical axis represents the AF evaluation value, respectively.

As shown in FIGS. 10B and 10C, when the subject distance is infinite ($\infty$), the curve of the AF evaluation value of the contrast AF at the zoom W-end changes more smoothly compared to at the zoom T-end. For this reason, in order to secure sufficient AF accuracy, the focus lens group 102 should be moved in a wide range. Therefore, in the present embodiment, in order to provide approximately constant over infinity margin over the entire region from the zoom T-end to the zoom W-end, a distance from the far end focus position to the infinite ($\infty$) focus position (the rotation margin of the focus ring 120) is set so as to be larger as a zoom magnification becomes smaller. In the case where the over infinity margin is set to be too large at the zoom T-end, when the zoom magnification is changed by changing the zoom area from the zoom T-end to the zoom W-end, blur of an image increases until reaching an in-focus state, and it is difficult to determine a field angle. Therefore, the over infinity margin should be set so that the field angle can be determined and the AF accuracy can be secured.

For example, when the subject distance is infinite, as shown in FIG. 10C, an AF evaluation value curve S1 at the zoom T-end curves sharply with respect to the moving distance (the rotational angle of the focus ring 120) of the focus lens group (second lens-group) 102. For this reason, even when the over infinity margin is not so large, the focus position can be determined relatively accurately. On the other hand, as shown in FIG. 10B, an AF evaluation value curve S2 at the zoom W-end has a curve smoother than that of the AF evaluation value curve S1. Therefore, when the over infinity margin $\Delta \times 1$ is constant over the entire zoom area from the zoom T-end to the zoom W-end like the focusing curve P03, at the zoom W-end a difference between the AF evaluation value at the far end and a local maximum value of the AF evaluation value is Δa1 as shown by the AF evaluation value curve S02, namely, that value is very small. Therefore, the focus position cannot be accurately determined.

On the other hand, when it is configured that the over infinity margin (Δx2 at the zoom W-end) becomes larger as the zoom position is closer to the zoom W-end like the focusing curve P3 of the zoom lens 3 according to the present embodiment, even at the zoom W-end, a difference between the AF evaluation value at the far end and a local maximum value of the AF evaluation value is Δa2, which is comparatively large. As a result, a local maximum point, namely, the focus point can be determined sufficiently accurately.

6. Electronic Zoom Tracking

When the zoom ring 110 rotates, the focus cam pin 91P moves along the focus cam (third cam groove for the second lens-group) 162, as described above. As a result, the focus lens group (second lens-group) 102 moves. As shown in FIG. 8, however, according to the focus cam 162 of the present embodiment, as the zoom position moves from the telephoto end to the wide-angle end, the rotational angle of the focus ring, namely, the position of the focus lens group 102 shifts. The amount of this shift becomes larger as the subject distance is farther.

In the present embodiment, therefore, when the zoom ring 110 is operated in an in-focus state, the focus lens group 102 is moved to keep the in-focus state (this operation is referred to as "electronic zoom tracking").

Figure 11B:
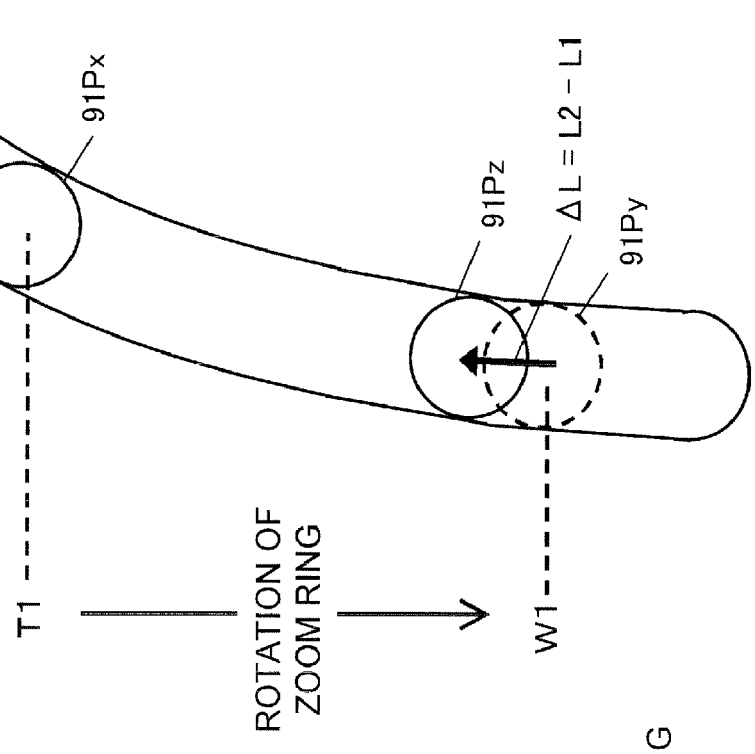
FIG. 11 is a diagram describing electronic zoom tracking.
Figure 11A:
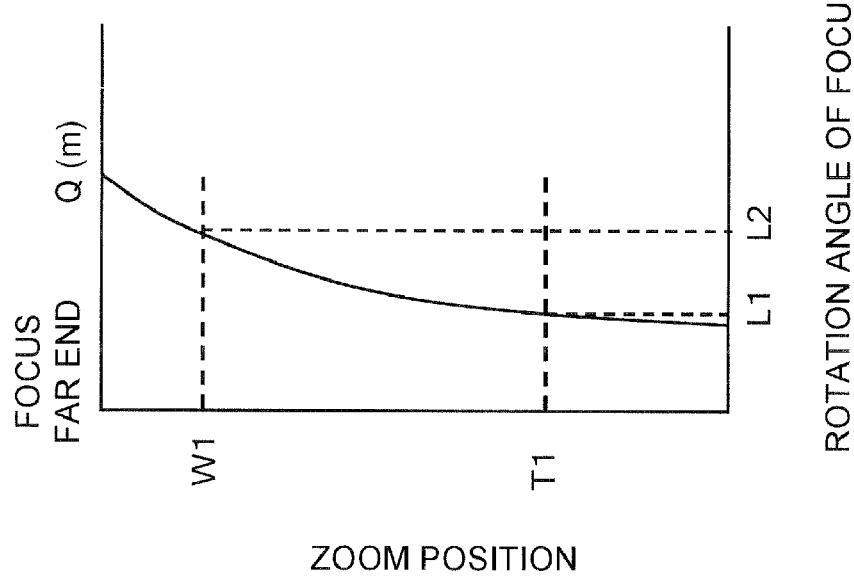

For example, the case will be examined, where in an in-focus state at a certain subject distance (Q (m)), the zoom ring 110 is rotated to change the zoom position from a position T1 to a position W1. As shown in FIG. 11A, the rotational angle of the focus ring 120 for the zoom position T1 is denoted by L1, and the rotational angle of the focus ring 120 for the zoom position W1 is denoted by L2. When the zoom ring 110 is rotated from the position T1 to the position W1, the rotational angle of the focus ring 120 remains to be L1 when the electronic zoom tracking is not performed, and as shown in FIG. 11B, the focus cam pin 91P moves from a position 91Px to a position 91Py along the focus cam 162. However, in order to keep the in-focus state, the rotational angle of the focus ring 120 has to be adjusted to L2. Therefore, the electronic zoom track is performed to move the focus ring 120, namely, the focus lens group 102 by a difference ΔL (=L2−L1). As a result, the zoom operation can be performed while the in-focus state is being kept.

The control of the electronic zoom tracking will be specifically described. The lens microcomputer 40 acquires information about the rotational angle of the zoom ring 110 from the zoom ring angle detector 48, and acquires information about the rotational angle of the focus ring 120 from the focus ring angle detector 49. The lens microcomputer 40 further reads information about the focusing curve from the memory 45. The lens microcomputer 40 acquires the rotational angles of the zoom ring 110 and the focus ring 120 from the zoom ring angle detector 48 and the focus ring angle detector 49, respectively, during the in-focus state before the rotation, and specifies one focusing curve. When the zoom ring 120 is rotated to change the zoom position, the lens microcomputer 40 determines a position of the focus lens group 102 corresponding to a new zoom position using the specified focusing curve, and controls the focus lens drive controller 42 to move the focus lens group 102 to the determined position. Such an electronic zoom tracking operation allows the zoom operation to be performed while the focus state is being kept.

There are an infinite number of focusing curves for the subject distance ranging from nearest distance (0.5 m) to infinity (∞). Therefore, it is not realistic to store all data in the memory 45 of the zoom lens 3. In the present embodiment, a finite number of pieces of information about focusing curve for a finite number of subject distances are stored in the memory 45. When the focusing curves stored in the memory 45 do not include a focusing curve for a desired subject distance, the focusing curve for the desired subject distance can be obtained by using the stored two focusing curves. A method for creating a focusing curve of any subject distance from the data about the two focusing curves in a pseudo manner will be described below.

The data about the focusing curves to be stored in the memory 45 include data which is related to the zoom position and is about the focus position of the focus lens group 102 based on the far end (that is, the rotational angle of the focus ring 120). When the zoom movement occurs, the focus position of the focus lens group 102 to be moved is calculated based on data about the focus positions of the focus lens group 102 corresponding to a current zoom position for the two subject distances, data about a current position of the focus lens group 102, and data about focus positions of the focus lens group 102 after the zoom movement for the two subject distances. The focus lens group 102 is moved to the calculated position. By driving the focus lens group 102 continuously during the zoom movement in such a manner, a shift of the focus due to the zoom can be reduced to approximately zero at a practical level.

Figure 12:
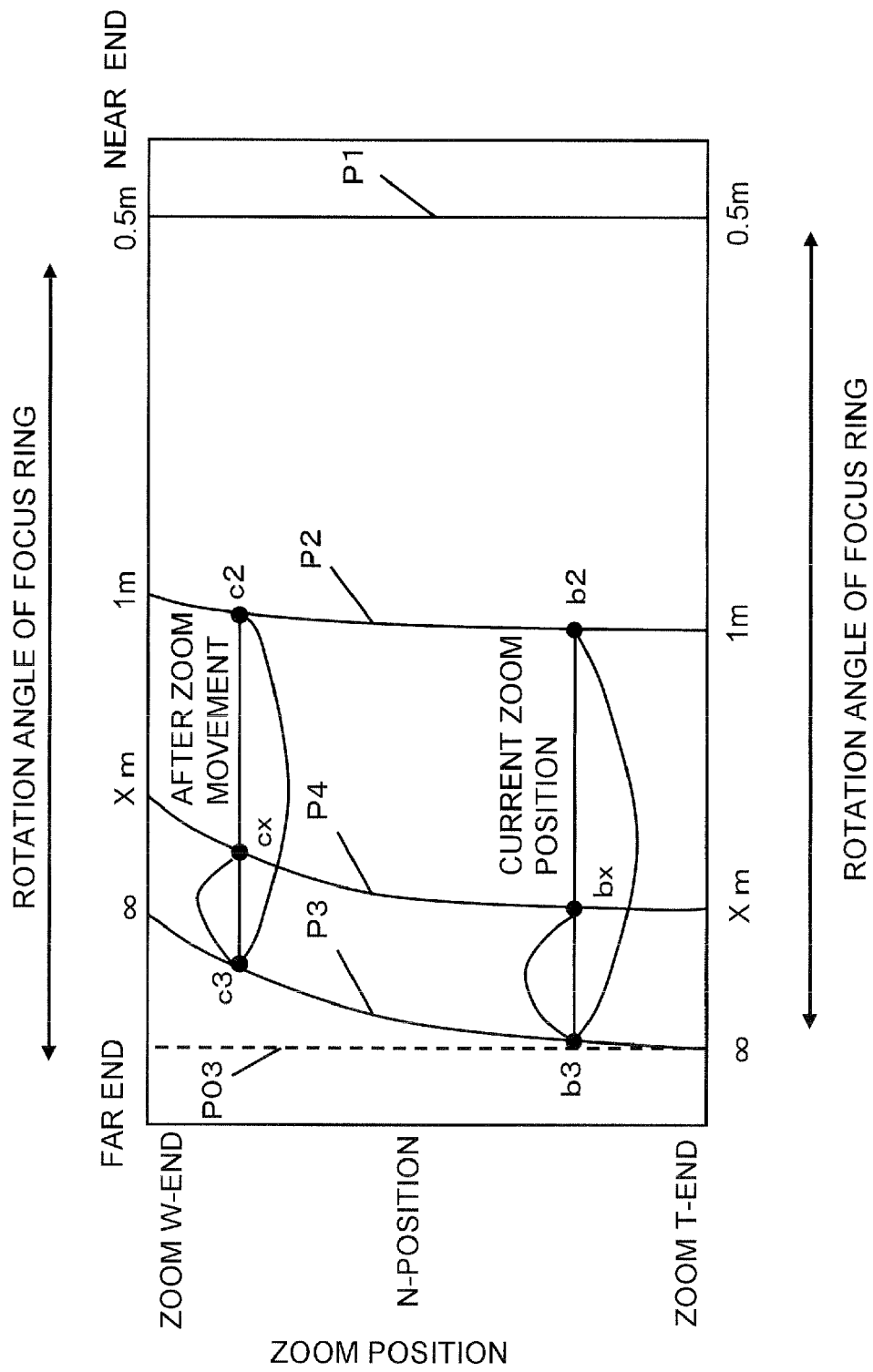
FIG. 12 is a diagram describing electronic zoom tracking.

With reference to FIG. 12, a method for calculating the focus position of the focus lens group 102 at the subject distance x(m) using the information about the focusing curves P2 and P3 for the subject distances of 1 m and infinity (∞) will be described. The memory 45 stores the focus positions of the focus lens group 102 in each zoom position (the rotational angle of the focus ring) in the three focusing curves P1 to P3 shown in FIG. 12.

The focus positions of the focus lens group 102 on the current zoom position of the subject distances of 1 m and infinity (∞) are b2 and b3, and the focus positions of the focus lens group 102 after the zoom movement are c2 and c3. When the focus position of the focus lens group 102 on the current zoom position at the subject distance xm is bx, the focus position cx of the focus lens group 102 after the zoom movement is obtained according to the following equation:

$$cx = c3 - (c3-c2)(b3-bx)/(b3-b2) \qquad (1)$$

For any subject distance between 0.5 m and 1 m, the focus position can be calculated similarly by using the focusing curves P1 and P2. Therefore, with the use of the equation (1), the focus position of the focus lens group 102 at any subject distance and on any zoom position can be calculated with practical accuracy by storing information about a finite number of focusing curves of the focus lens group.

As described above, the hill-climbing contrast AF operation is enabled even in a combination of a high magnification zoom lens and a digital single-lens camera, and the focus movement due to the zoom can be reduced to almost zero level in practical use.

When the subject distance is within a predetermined distance, the electronic zoom tracking may not be performed. For example, when the subject distance is 1m or less, the electronic zoom tracking may not be performed. In this case, even when the zoom position is moved from the zoom T-end to the zoom W-end, the focus position does not shift by the focus cam 162 according to the present embodiment, and therefore it does not matter if the electronic zoom tracking is not performed.

The above embodiment describes the configuration of the lens interchangeable digital camera, but the idea of the above-mentioned embodiment can be applied also to a configuration where a lens and a body are integrated. In this case, the zoom ring 110 and the focus ring 120 may be rotated in conjunction with the operation of another operating member such as a lever.

INDUSTRIAL APPLICABILITY

The present invention can be applied widely to four groups of inner-focus type zoom lenses and an imaging apparatus using the zoom lenses.

What is claimed is:

1. A zoom lens containing a plurality of lens groups including a focus lens group, comprising:
   a focus cam operable to convert a first rotation amount provided by a focus operation into a movement of the focus lens group, and further converting, in addition to the first rotation amount, a second rotation amount provided by a zoom operation into a movement of the focus lens group;
   a zoom cam operable to convert the second rotation amount provided by the zoom operation into a movement of a predetermined lens group;
   a focus driving unit operable to rotate the focus cam by the first rotation amount;
   a zoom driving unit operable to rotate the zoom cam by the second rotation amount; and
   a focus cam follower engaged with the focus cam and operable to move in the focus cam, wherein
   the zoom driving unit rotates the focus cam follower in the focus cam according to a rotation amount of the zoom driving unit so that the focus lens group is moved,
   the focus cam is configured so that a moving amount of the focus lens group corresponding to a unit rotation amount of the focus driving unit varies according to a rotational position of the zoom driving unit, and
   a lift amount of the focus cam is defined by a cam curve so that a rotation amount of the focus driving unit from a far end position to an infinite position when the rotational position of the zoom driving unit is at a wide-angle end becomes larger than the rotation amount when the rotational position of the zoom driving unit is at a telephoto end.

2. The zoom lens according to claim 1, further comprising:
   a first detector operable to detect the rotation amount of the zoom driving unit;
   a second detector operable to detect the rotation amount of the focus driving unit;
   a data storage operable to store focus data which relates a position of the focus lens group in an in-focus state to a zoom position for at least two subject distances;
   a calculation unit operable to calculate a rotation amount of the focus driving unit which is necessary for maintaining an in-focus state for a current subject distance with reference to the focus data when the zoom driving unit is operated; and
   a focus cam driver operable to drive the focus cam by the calculated rotation amount.

3. The zoom lens according to claim 2, wherein when a subject distance is in a predetermined range, the focus cam driver does not operate.

4. The zoom lens according to claim 1, wherein the lift amount of the focus cam is defined by the cam curve so that when a subject distance is in a predetermined range, a rotational angle of the focus driving unit from the far end position to a focus position for the subject distance in the predetermined range is constant regardless of the rotational position of the zoom driving unit.

5. The zoom lens according to claim 4, wherein when a subject distance is in the predetermined range, the focus cam driver does not operate.

6. The zoom lens according to claim 1, wherein the zoom lens is an inner focus lens which includes the plurality of lens groups, and the focus lens group is any one of the plurality of lens groups which is disposed closer to an imaging device than a lens group which is disposed closest to a subject.

7. An imaging apparatus to which the zoom lens according to claim 1 is mountable or included, comprising:
   an imaging unit operable to capture a subject to generate an image signal;
   a focus detector operable to detect a focus state based on the image signal; and
   a controller operable to control the focus driving unit to rotate the focus cam based on a current rotational position of the focus driving unit and the focus state detected by the focus detector.

8. A zoom lens comprising:
   a plurality of lens groups including a focus lens group;
   a focus ring operable to perform a focus operation by rotation;
   a zoom ring operable to perform a zoom operation by rotation;
   a focus cam operable to be rotated by a first rotation amount, based upon the focus operation performed by the focus ring, and convert the first rotation amount into a movement of the focus lens group, and operable to be rotated by a second rotation amount, based upon the zoom operation performed by the zoom ring, and convert the second rotation amount into a movement of the focus lens group;
   a zoom cam operable to be rotated by the second rotation amount, based upon the zoom operation performed by the zoom ring, and convert the second rotation amount into a movement of a predetermined lens group among the plurality of lens groups;
   a focus cam follower engaged with the focus cam and operable to move in the focus cam, wherein:
   the zoom ring rotates the focus cam follower in the focus cam according to a rotation amount of the zoom ring so that the focus lens group is moved; and
   the focus cam is configured so that a moving amount of the focus lens group corresponding to a unit rotation amount of the focus ring varies according to a rotational position of the zoom ring;
   wherein a lift amount of the focus cam is defined by a cam curve so that a rotation amount of the focus ring from a far end position to an infinite position when the rotational position of the zoom ring is at a wide-angle end becomes larger than the rotation amount when the rotational position of the zoom ring is at a telephoto end.

9. The zoom lens according to claim 8, wherein the zoom lens is an inner focus lens which includes the plurality of lens groups, and the focus lens group is any one of the plurality of lens groups which is disposed closer to an imaging device than a lens group which is disposed closest to a subject.

10. The zoom lens according to claim 8, wherein the lift amount of the focus cam is defined by the cam curve so that when a subject distance is in a predetermined range, a rotational angle of the focus ring from the far end position to a focus position for the subject distance in the predetermined range is constant regardless of the rotational position of the zoom ring.

11. The zoom lens according to claim 8, further comprising:
- a first detector operable to detect the rotation amount of the zoom ring;
- a second detector operable to detect the rotation amount of the focus ring;
- a data storage operable to store focus data which relates a position of the focus lens group in an in-focus state to a zoom position for at least two subject distances;
- a calculation unit operable to calculate a rotation amount of the focus ring which is necessary for maintaining an in-focus state for a current subject distance with reference to the focus data when the zoom ring is operated; and
- a focus cam driver operable to drive the focus cam by the calculated rotation amount.

12. An imaging apparatus to which the zoom lens according to claim 8 is mountable or included, said imaging apparatus comprising:
- an imaging unit operable to capture a subject to generate an image signal;
- a focus detector operable to detect a focus state based on the image signal; and
- a controller operable to control the focus ring to rotate the focus cam based on a current rotational position of the focus ring and the focus state detected by the focus detector.

* * * * *